(12) United States Patent
Hamasaki et al.

(10) Patent No.: US 10,725,062 B2
(45) Date of Patent: Jul. 28, 2020

(54) DISPENSING DEVICE

(71) Applicant: Hitachi High-Technologies Corporation, Tokyo (JP)

(72) Inventors: Koshin Hamasaki, Tokyo (JP); Yoshihiro Yamashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 178 days.

(21) Appl. No.: 15/746,434

(22) PCT Filed: Jul. 11, 2016

(86) PCT No.: PCT/JP2016/070360
§ 371 (c)(1),
(2) Date: Jan. 22, 2018

(87) PCT Pub. No.: WO2017/022412
PCT Pub. Date: Feb. 9, 2017

(65) Prior Publication Data
US 2018/0203029 A1     Jul. 19, 2018

(30) Foreign Application Priority Data
Aug. 4, 2015   (JP) .................................. 2015-153799

(51) Int. Cl.
*G01N 1/00*     (2006.01)
*G01N 35/10*    (2006.01)
(Continued)

(52) U.S. Cl.
CPC ............ *G01N 35/1002* (2013.01); *B01L 3/52* (2013.01); *B01L 3/567* (2013.01); *F16K 7/14* (2013.01);
(Continued)

(58) Field of Classification Search
CPC ....................................................... G01N 1/00
See application file for complete search history.

(56) References Cited

U.S. PATENT DOCUMENTS

| 3,804,108 | A | * | 4/1974 | Ferrari | .................... | F16K 13/10 |
| | | | | | | 137/112 |
| 5,380,665 | A | * | 1/1995 | Cusack | .................. | G01N 35/08 |
| | | | | | | 422/82 |

(Continued)

FOREIGN PATENT DOCUMENTS

| EP | 1 134 586 A1 | 9/2001 |
| EP | 2738431 A1 | 5/2015 |

(Continued)

OTHER PUBLICATIONS

Extended European Search Report received in corresponding European Application No. 16832691.6 dated Feb. 1, 2019.

(Continued)

*Primary Examiner* — Jyoti Nagpaul
(74) *Attorney, Agent, or Firm* — Mattingly & Malur, PC (57) ABSTRACT

An amount of gas remaining within a fluid control valve is reduced according to a method for fixing the fluid control valve to achieve highly accurate trace dispensation by simply removing gas. The dispensing device has a discharge nozzle, a liquid feeding tube that is disposed so as to connect a reagent bottle in which a reagent is stored and the discharge nozzle and forms a reagent flow path, and a fluid control valve that is disposed on the liquid feeding tube route connecting the reagent bottle and the discharge nozzle. The fluid control valve is provided with a reagent flow path having a liquid inlet and a liquid outlet and a diaphragm valve provided in the middle of the flow path. The fluid control valve is disposed in an orientation such that the diaphragm valve is disposed at the bottom of the flow path of the fluid control valve.

14 Claims, 11 Drawing Sheets

(51) Int. Cl.
  *B01L 3/00* (2006.01)
  *F16K 7/14* (2006.01)
(52) U.S. Cl.
  CPC ...... *G01N 35/10* (2013.01); *B01L 2200/0684* (2013.01); *B01L 2200/16* (2013.01)

(56) References Cited

U.S. PATENT DOCUMENTS

| | | |
|---|---|---|
| 2003/0155371 A1 | 8/2003 | Collasius et al. |
| 2014/0174161 A1 | 6/2014 | Ono |

FOREIGN PATENT DOCUMENTS

| | | |
|---|---|---|
| JP | 57-105971 U | 6/1982 |
| JP | 10-115622 A | 5/1998 |
| JP | 10-227799 A | 8/1998 |
| JP | 11-242040 A | 9/1999 |
| JP | 2007-315872 A | 12/2007 |
| JP | 2013-047672 A | 3/2013 |
| WO | 2013/014905 A1 | 1/2013 |

OTHER PUBLICATIONS

International Search Report of PCT/JP2016/070360 dated Oct. 4, 20116.

* cited by examiner

| θr | 0° | | | | |
|---|---|---|---|---|---|
| θz | 0° | 30° | 45° | 65° | 90° |
| BUBBLE ESCAPING TIME | >60sec | >10sec | >10sec | <5sec | >10sec |
| BUBBLE REMOVAL | NO | YES | | | |

[Fig. 15]

| θr | 0° | 45° |
|---|---|---|
| θz | 65° | |
| BUBBLE ESCAPING TIME | <5sec | |
| BUBBLE REMOVAL | YES | |

DISPENSING DEVICE

TECHNICAL FIELD

The present invention relates to a technique for highly accurate trace dispensation by removing bubbles in a fluid control valve in a dispensation mechanism such as an automatic analysis apparatus.

BACKGROUND ART

In a biochemical automatic analysis apparatus, trace quantification is proceeded in the long term, and quantitativity and reproducibility are required as well. In addition, in a biochemical analysis device, as a technique for dispensing a specimen or reagent, a dispensation technique of sucking or discharging a predetermined fluid by using a syringe pump is widely employed, in general. A highly accurate dispensation technique is the most important element technique in order to realize quantitativity and reproducibility in trace dispensation.

In a dispensing device, a valve for controlling a direction of a fluid is provided between a nozzle for discharging liquid and a syringe pump in many cases, and with this fluid control valve, a complicated flow path configuration is possible. In such a dispensation mechanism, there is a case where, during dispensation operation of repeatedly performing suction of a fluid, bubbles are adhered to a fluid control inner wall accommodating a fluid or an irregular portion connected to a flow path. If trace dispensation is carried out while there are adhered bubbles, the internal pressure of a flow path fluctuates as a result of variation in the volume of the bubbles, and the amount of liquid to be dispensed becomes inconsistent, and thus there is a problem that dispensing accuracy decreases.

For this reason, removing bubbles by providing a special mechanism in a dispensing device is carried out. For example, as in PTL 1, an invention provided with a vibration mechanism for removing bubbles in a dispensing device is known.

CITATION LIST

Patent Literature

PTL 1: JP-A-11-242040

SUMMARY OF INVENTION

Technical Problem

However, in the invention disclosed in PTL 1, there is a problem in that the configuration of a dispensing device becomes complicated since it is necessary to provide a special vibration mechanism in order to remove bubbles.

An object of the present invention is to provide a dispensing device that can extremely simply reduce gas remaining within a fluid control valve by devising a method for fixing the fluid control valve and achieve highly accurate trace dispensation by easily removing gas.

Solution to Problem

The present invention relates to disposition of a fluid control valve for opening and closing a flow path through which a trace fluid is sucked or discharged, a structure of the flow path connected to the fluid control valve, a center, a fixing metal plate, and syringe pump operation in an automatic analysis apparatus. The present invention achieves the object by employing a device configuration having the following features.

For example, the present invention includes a discharge nozzle, a liquid feeding tube that is disposed so as to connect a reagent bottle in which a reagent is stored and the discharge nozzle to each other and forms a flow path of the reagent, and a fluid control valve that is disposed on a route of the liquid feeding tube connecting the reagent bottle and the discharge nozzle to each other. The fluid control valve includes the flow path, of the reagent, having a liquid inlet and a liquid outlet and a diaphragm valve provided in the middle of the flow path, and the fluid control valve is disposed in an orientation such that the diaphragm valve is disposed at the bottom of the flow path of the fluid control valve.

More specifically, a disposition direction of the fluid control valve is rotated 180° and the fluid control valve is disposed as being inclined such that an implementation direction of the fluid control valve is positioned in an inclined direction to directions of the flow path and the line of gravity. In addition, the present invention is configured of the fluid control valve, a liquid feeding pump, a pipe, a discharge port, a liquid supply source, and a liquid, and is disposed having an inclination such that the liquid outlet of the fluid control valve is positioned upper than the liquid inlet and a face of a diaphragm of the fluid control valve is oriented upward on a valve chamber side.

Advantageous Effects of Invention

According to the present invention, it is possible to provide a dispensing device that can extremely simply reduce gas remaining within a fluid control valve by devising a method for fixing the fluid control valve and achieve highly accurate trace dispensation by easily removing gas. Other objects, configurations, and effects than the above description will be clarified with descriptions in the following embodiments.

DESCRIPTION OF EMBODIMENTS

Hereinafter, description will be provided on a dispensing device and an analysis device using the dispensing device in the embodiments of the present invention with reference to drawings. The present invention is not limited to the embodiments.

Figure 1:
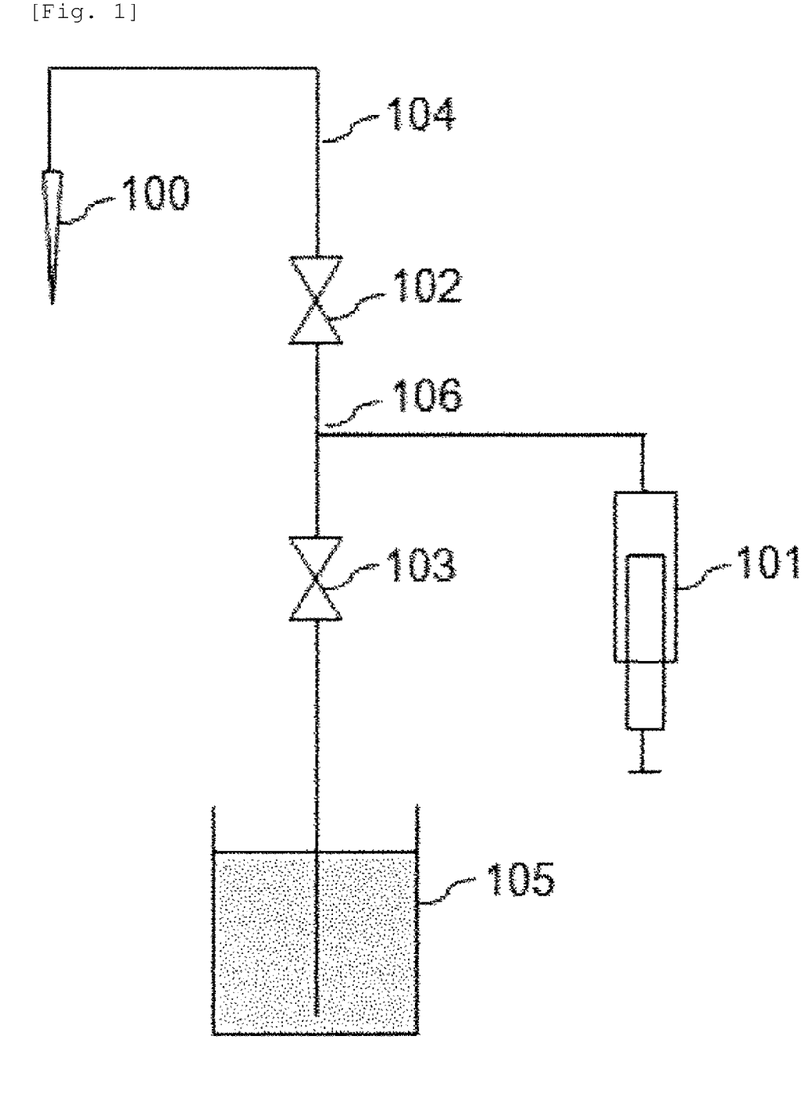
FIG. 1 is a system diagram of a dispensation mechanism of a biochemical automatic analysis apparatus.

A biochemical automatic analysis apparatus has a dispensation mechanism as illustrated in FIG. 1. The dispensation mechanism is configured of a discharge nozzle 100, a syringe pump 101, a fluid control valve (discharge nozzle side) 102, a fluid control valve (reagent bottle side) 103, and a liquid feeding tube 104, and dispenses a reagent held in a state of being stored in the reagent bottle 105 to a reaction container. The liquid feeding tube 104 is disposed to connect a reagent bottle and a discharge nozzle to each other and forms a flow path of the reagent. The fluid control valve (discharge nozzle side) 102 and the fluid control valve (reagent bottle side) 103 are disposed on a route of the liquid feeding tube 104 connecting the reagent bottle and the discharge nozzle to each other.

In realizing trace dispensation, components of the dispensation mechanism are desirably the following members, but the configuration of the present invention is not limited to the following members. Here, trace is defined as being 0.2 ml or less, and in particular, description is provided on the effect of dispensation in a range of 4 ul to 120 ul.

It is desirable that the discharge nozzle 100 be made with metal such as stainless steel to have an inner diameter of approximately 0.5 mm or less in order to make a direction and a velocity of a fluid at the time of discharging a solution uniform and to improve liquid outage of the solution. It is desirable that the syringe pump 101 have a cylinder made of an acrylic resin and a plunger made of a fluoride polymer, and implement discharge and suction using a ball screw and a stepping motor, in order to reduce pressure loss. It is desirable that as the fluid control valve (discharge nozzle side) 102 and the fluid control valve (reagent bottle side) 103, diaphragm-type electromagnetic valves be used since a pumping amount at the time of valve opening becomes small as an opening and closing velocity is high. The above configuration is generally available, with the articles on the market, easily acquirable, and also superior in terms of price. It is desirable that the liquid feeding tube 104 be made of a fluoride polymer having a low wettability so as to reduce pressure loss due to flow path resistance, and be configured to have an inner diameter of 1 mm or less so as to further reduce a dead volume and enhance a liquid feeding efficiency. It is desirable that the reagent bottle 105 be disposed as being opened under an atmospheric pressure so as to facilitate exchange.

Description will be provided on a dispensing procedure. As illustrated in FIG. 1, the discharge nozzle 100 is connected to the fluid control valve (discharge nozzle side) 102 via the liquid feeding tube 104, and is further connected to the syringe pump 101 and the fluid control valve (reagent bottle side) 103 via a branch 106. The fluid control valve (reagent bottle side) 103 is connected to the reagent bottle via the liquid feeding tube 104. In a case of dispensing a reagent, the fluid control valve (discharge nozzle side) 102 is closed first, and in a state where the fluid control valve (reagent bottle side) 103 is opened, the syringe pump 101 sucks the reagent. When a predetermined amount of the reagent is filled in the liquid feeding tube 104, the syringe pump 101 stops suction operation, subsequently, the fluid control valve (reagent bottle side) 103 is closed, and then the fluid control valve (discharge nozzle side) 102 is opened. Subsequently, the syringe pump 101 operates in a discharge direction, and the predetermined amount of the reagent is discharged from the discharge nozzle 100. Therefore, liquid feeding is always carried out in a direction of the discharge nozzle 100 from the reagent bottle 105.

In order to maintain precision in dispensation over a plurality of times, when a pressure is applied within the flow path by the syringe pump 101 and a solution is discharged in the direction of the discharge nozzle 100, a constant pressure is reproducibly applied. In a case where the pressure is unstable, the amount of a fed liquid is inconsistent and the final liquid outage is deteriorated, thereby causing a decrease in the discharge amount by approximately 0.5 to 2 ul. There are several factors for instability of quantitative discharge. There is a case where a member is deformed by a pressure, or a case where liquid outage is deteriorated due to vibration of a device itself, but the biggest factor is bubbles mixed within a flow path. In a case of using the opened reagent bottle 105, dissolved oxygen may be eluted and bubbles may be generated within the liquid feeding tube 104. In particular, elution of dissolved oxygen is accelerated in accordance with a decrease in a pressure at the time of suction of the syringe pump 101. The volume of the bubbles significantly varies due to a pressure compared to that of a solution, and thus the volume of the bubbles expands due to a low pressure at the time of suction and causes insufficient suction of the solution. On the other hand, in a pressurized state at the time of discharge, the volume of the bubbles shrinks. In this way, the original pressure propagation is impaired, and this also causes insufficient discharge. For example, when all oxygen is eluted, in a state where a solution in which dissolved oxygen reaches a saturated amount at 25° C. is filled in a liquid feeding tube having an inner diameter of 1 mm and a length of 1 m, the amount corresponds to the amount of bubbles of approximately 4 ul under an atmospheric pressure. However, in an actual reagent, oxygen is not in a saturated state and 100% of elution is also not present, and thus the elution amount of the bubbles is not even 1 ul. When dispensation operation was actually repeatedly performed, a phenomenon was confirmed that 1 to 3 numbers of bubbles with a diameter of approximately 1 mm were mixed within a liquid feeding tube in a frequency of approximately 1 time out of 20 times, and the insufficient discharge amount of approximately 1 to 5 ul with respect to quantitative dispensation of 120 ul occurred.

Figure 2:
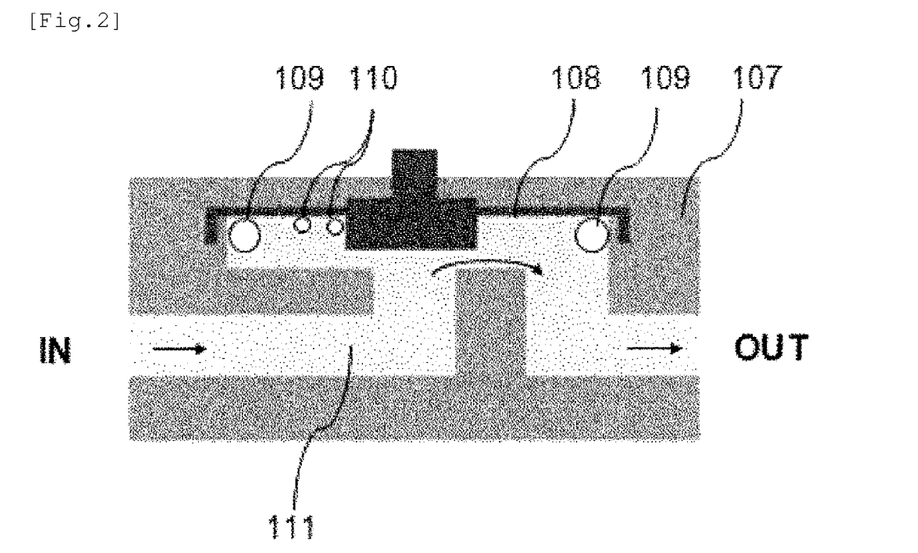
FIG. 2 illustrates an adhered position of bubbles in a case where a diaphragm is disposed on an upper portion, using a schematic view of a section of a diaphragm-type bidirectional electromagnetic valve.

When the liquid feeding tube 104 was observed with regard to a point at which bubbles bringing about the insufficient discharge amount were generated, it was found that bubbles were frequently generated from the fluid control valve (reagent bottle side) 103. Hereinafter, description will be provided on generation of the bubbles using FIG. 2. FIG. 2 illustrates a structure of the fluid control valve. The fluid control valve in FIG. 2 includes a disk-shaped diaphragm and a flow path divided into a liquid inlet (IN in FIG. 2), a liquid outlet (OUT in FIG. 2), and a valve chamber. Here, the valve chamber indicates a space having the diaphragm in FIG. 2 as a side face. The valve chamber is in a columnar shape, and the diaphragm can reciprocate in the valve chamber in a columnar axis direction. The liquid inlet and the liquid outlet are connected to each other via a tube-shaped flow path, and the flow path from the liquid inlet is connected to the valve chamber via an entrance of the chamber provided in a central axis of the valve chamber (central axis of the diaphragm). The flow path is connected from an exit provided at the end of the valve chamber to the liquid outlet. The path from the liquid inlet to the liquid outlet is a reagent flow path in the fluid control valve, and the diaphragm is disposed in the middle of the reagent flow path. A central portion of the diaphragm has a thickness, and in a case of blocking a flow, the diaphragm shuts off the flow path by operating in a liquid inlet direction and coming into tight contact with a connecting portion with the liquid inlet. In each valve chamber, the entrance side of the flow path is IN, and the exit side of the flow path is OUT, in the following explanation.

In addition, when a solution was observed by changing a head 107 of the fluid control valve (reagent bottle side) 103 illustrated in FIG. 2 into a transparent member, an aspect was observed that, at the time of sucking a reagent, bubbles 110 of 1 mm not filled in the valve chamber expanded and the bubbles were adhered to a gap between a surface or body of the diaphragm 108. It could be confirmed that, at the time of discharge, small bubbles 110 shrunk and became visually non-perceivable, but after a while, the bubbles 110 grew to be bubbles 109 having a size perceivable even at the time of discharge (at the time of pressurization) and were accumulated on a portion where the flow was slow in the valve chamber. That is, eluted elongate bubbles are integrated together within the valve to become bubbles of the volume of approximately 1 mm, and when the bubbles come to be somewhat large, the bubbles move with the flow and are released. In addition, the internal volume of the valve chamber of the fluid control valve used in this examination is approximately 30 uL. When a liquid having passed through a liquid feeding tube with a diameter of 1.5 mm enters a valve chamber having a wide volume, the liquid comes into a reduced pressure state, bubbles expand, and thereby a pressure at the time of sucking a reagent becomes unstable.

As a factor for growth of bubbles in a fluid control valve, member characteristics of the diaphragm 108 are exemplified. The diaphragm 108 used in this examination is a molded product of polytetrafluoroethylene (PTFE). Since PTFE has an extremely strong water-repellent characteristic, PTFE is excellent as a seal member for sealing a gap between a coil portion of an electromagnetic valve and a diaphragm, and also has high flexibility and durability. In addition, the strong water-repellent characteristic makes it possible to obtain an effect of reducing pressure loss or an effect of preventing contamination due to protein and the like. On the other hand, it is considered that the strong water-repellent characteristic causes bubbles to be easily adhered and promotes growth of bubbles.

Moreover, although various fluid control valves can be used, a bidirectional diaphragm-type electromagnetic valve as used in this examination is desirable. In addition, it is desirable that a head, a seal, and a diaphragm member of the fluid control valve of the fluid control valve be selected from one or two or more combinations of PTFE, FKM, NBR, EPR, EPDM, PEEK, PPS, PSU, SUS304, SUS316, PFA, FFKM, FKMPC, TFE, POM, HPVC, ALM203, FPA, and silicon rubber. Moreover, it is desirable that a dead volume in the fluid control valve chamber be 50 uL or less. The inventors performed intensive examination to study the following solutions for preventing creation and accumulation of bubbles in the electromagnetic valve.

First, as a solution for preventing creation and accumulation of bubbles, the inventors devised a method of reducing adhesion of bubbles by hydrophilizing a diaphragm surface made of PTFE. Hydrophilization is possible by plasma irradiation or excimer UV irradiation. A water contact angle of a non-treated diaphragm surface is approximately 100°, when the non-treated diaphragm surface is subjected to a plasma treatment of 100 W for 10 minutes, the water contact angle of the diaphragm surface is around 40° and thus the diaphragm surface can be hydrophilized. Certain effects are obtained by hydrophilization. However, it is not possible to maintain hydrophilization for a long period of time due to contamination and it is difficult to completely suppress creation of bubbles. In addition, there is a possibility that bubbles are accumulated on a portion where a flow velocity decreases in the valve chamber.

Here, as another solution for preventing creation and accumulation of bubbles, it is desirable that the fluid control valve be disposed such that a side of the diaphragm 108 being in contact with the flow path is oriented upward in a vertical direction. In other words, the fluid control valve is disposed in an orientation such that the diaphragm is disposed at the bottom of the reagent flow path in the fluid control valve. Here, the "bottom" is not limited to downward in a vertical direction. The "bottom" of the flow path means that a certain angle range is allowable and includes the angle range described below.

Figure 3:
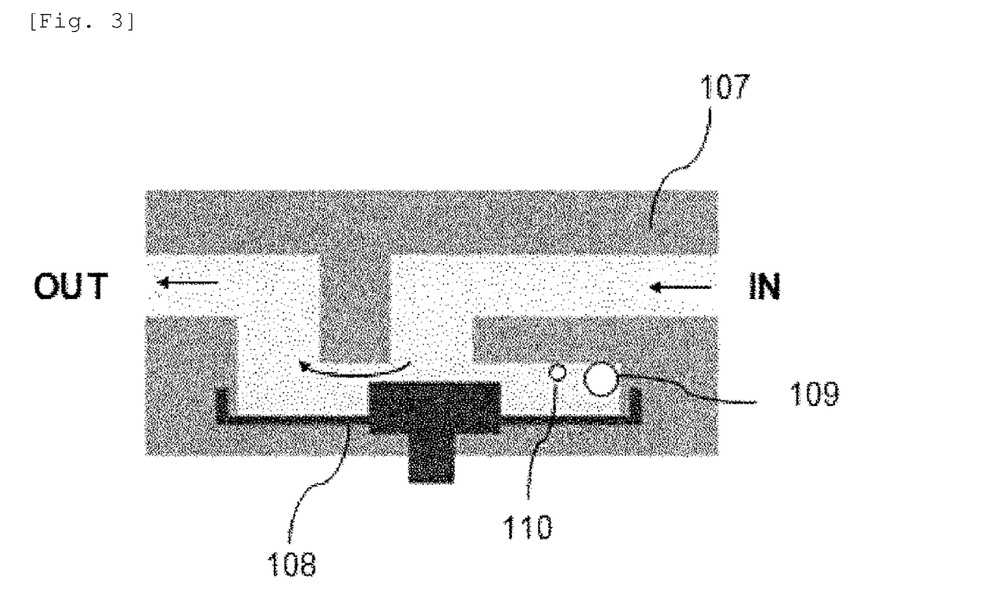
FIG. 3 illustrates an adhered position of bubbles in a case where a diaphragm is disposed on a lower portion, using a schematic view of a section of the diaphragm-type bidirectional electromagnetic valve.

FIG. 3 illustrates the aspect. With such a disposition, the created bubbles 109 and 110 are detached and expelled due to buoyancy and the flow of the liquid.

Figure 4:
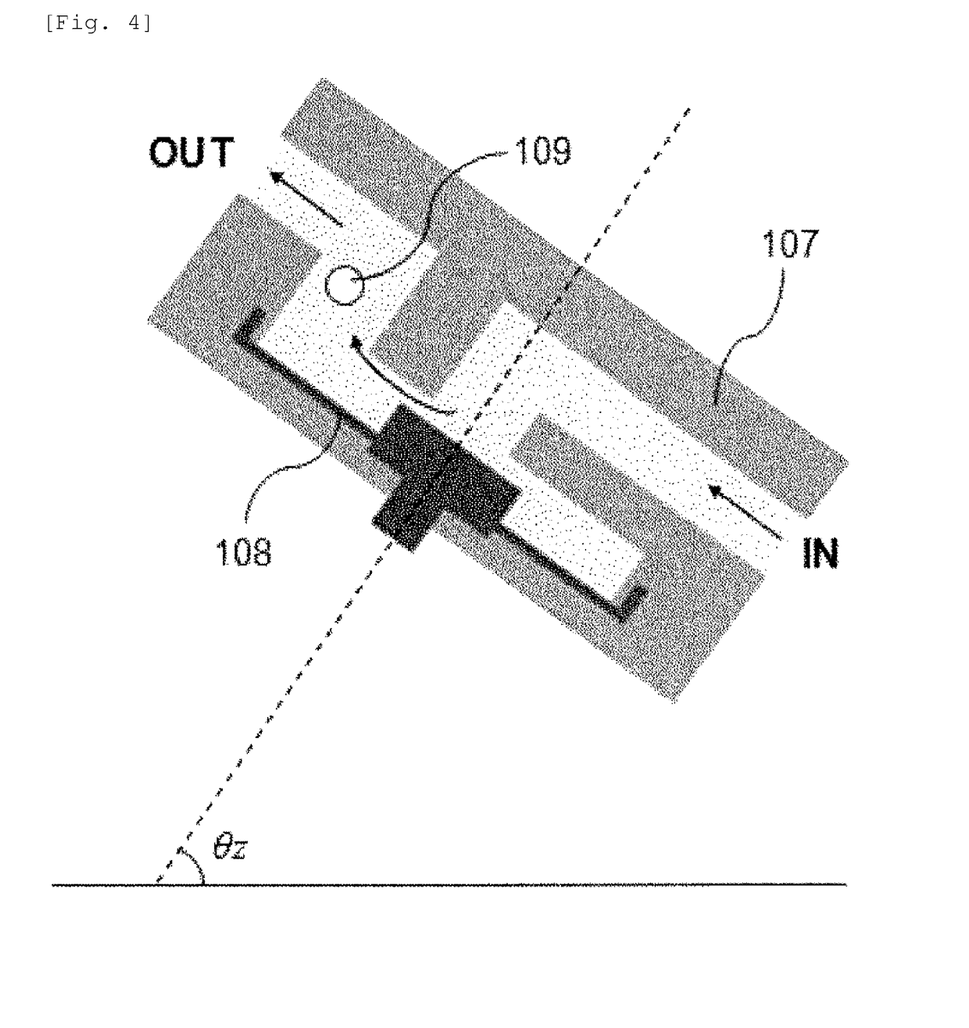
FIG. 4 illustrates an aspect that the diaphragm is disposed on a lower portion and a fluid flows from an IN side inside to an OUT side and from bottom to top, using a schematic view of a section in a case where the diaphragm-type bidirectional electromagnetic valve is disposed as being inclined.

In addition, as illustrated in FIG. 4, it is desirable that the fluid control valve is disposed as being inclined such that the water entrance side (IN) of the fluid control valve is on a lower side and the liquid outlet side (OUT) of the fluid control valve is on an upper side. In such a disposition, the reagent is fed from the lower side to the upper side. In other words, the fluid control valve is disposed such that the liquid inlet of the fluid control valve is positioned lower than the liquid outlet. Here, the "positioned lower" means that the height in the vertical direction is low. In FIG. 4 as well, the fluid control valve is disposed such that the side of the diaphragm 108 being in contact with the flow path is in an upper direction. With such a disposition, even if bubbles are created, the bubbles immediately float on the liquid outlet side and are expelled.

As described above, by changing the direction of the first diaphragm 108, a time taken for removing bubbles is significantly reduced. In particular, by disposing the fluid control valve to be inclined and setting the direction of the diaphragm to be an upper direction, the time for removing bubbles is further reduced, and it is possible to prevent accumulation of large bubbles.

Example 1

Figure 5:
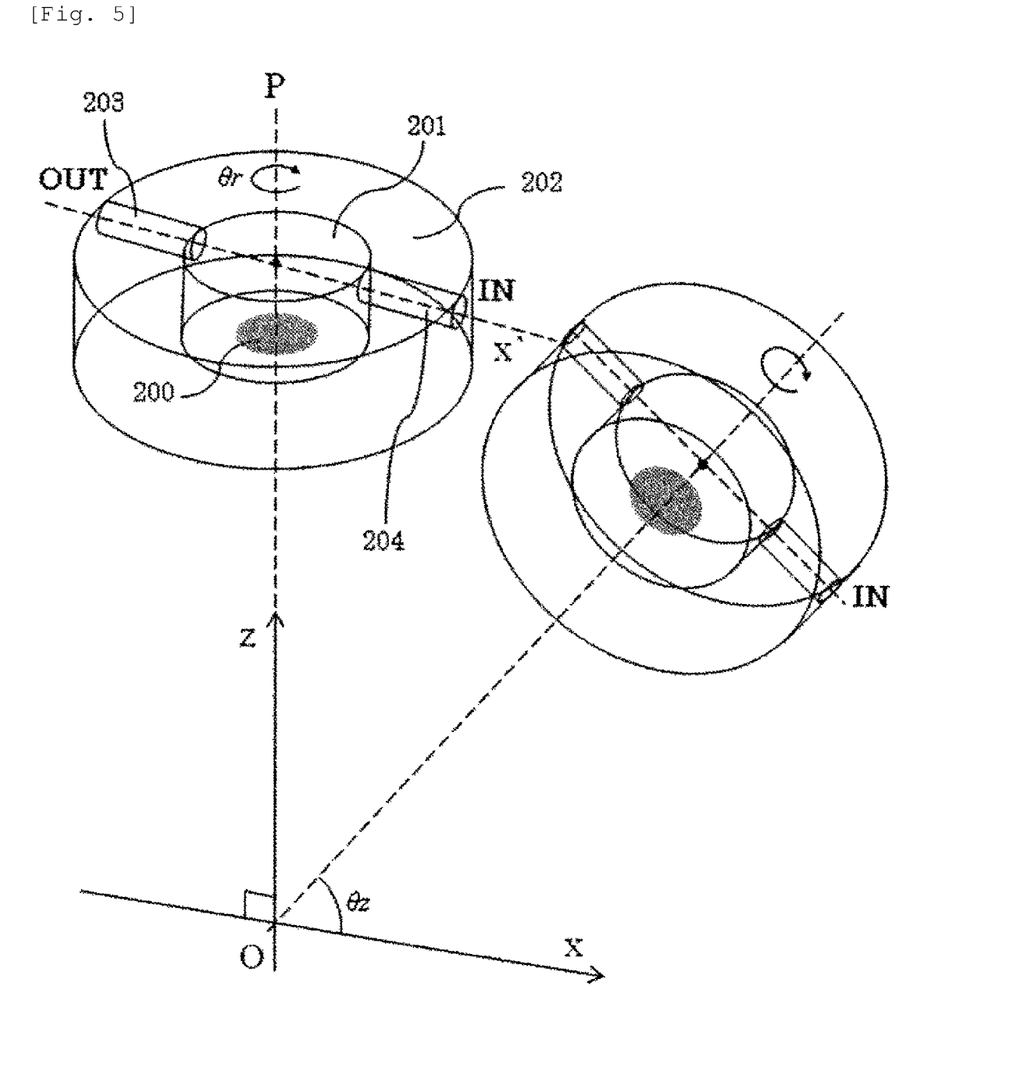
FIG. 5 illustrates a view depicting the definition of an attachment angle of a fluid control valve.

Description will be provided on the angle of the fluid control valve using FIG. 5. As illustrated in FIG. 5, when a side of a diaphragm 200 being in contact with a liquid is disposed to be oriented upward in a vertical direction, a direction from a liquid inlet 204 (IN side) to a liquid outlet 203 (OUT side) is set as an x axis. At this time, a central axis P of an electromagnetic valve is at a right angle to the x axis. Thi direction is set as a z axis.

As illustrated in FIG. 5, while a straight line x' linking the IN side and the OUT side was maintained within a xz plane, the central axis P was moved to be at several angles such that the IN side is always lower than the OUT side. P' axis, z axis, x axis, θr, and θz are defined as follows.

Figure 14:
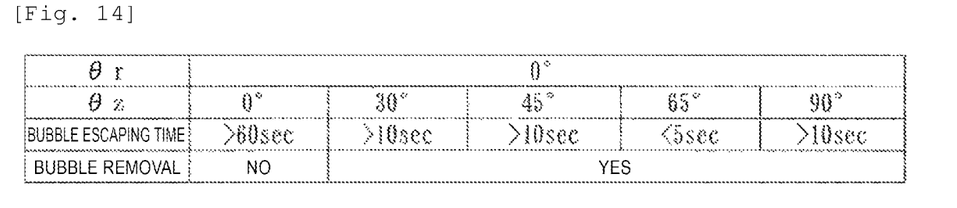
FIG. 14 illustrates a comparison table of bubble escaping at an inclination angle θz.

P' axis: A direction of a central axis of the electromagnetic valve z axis: A vertical direction x axis: A direction of a straight line linking IN and OUT in a specified state when the fluid control valve is disposed to satisfy P' axis=z axis θr: A rotational angle to the x axis of the straight line linking IN and OUT of the electromagnetic valve θz: An angle formed by the P' axis and a horizontal plane At this time, under conditions where θz=90°, 65°, 45°, 30°, and 0°, respectively, liquid feeding was carried out after filling the valve chamber with air at one time, and the time until bubbles completely escaped was measured. As a result, under the condition of θz=65°, the bubble escaping time was the shortest, and the bubbles were completely removed within 5 seconds while the liquid was filled in the valve chamber. In addition, under the conditions of θz=90°, 45°, and 30°, it was observed that a time of 10 seconds or more was required for the bubbles to completely escape. Under the condition of θz=0°, although there was a case where the bubbles completely escaped, the bubbles of approximately 1 mm did not completely escape even after additional 1 minute or more elapsed from the time when the bubbles were replenished in the body of the electromagnetic valve or a gap between the body and the diaphragm valve of the electromagnetic valve in a plurality of times of examination. Therefore, when the fluid control valve was disposed to satisfy 30°≤θz≤90°, the effect of removing bubbles was confirmed. In particular, under the condition of θz=65°, the bubbles can be removed at the fastest velocity (FIG. 14).

Figure 15:
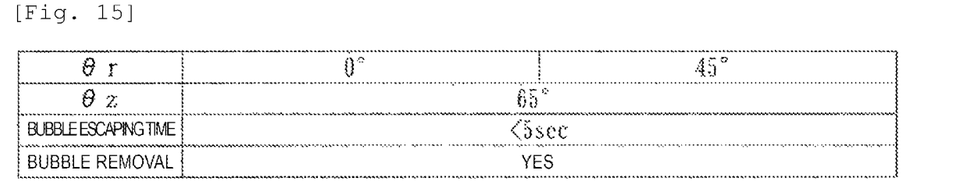
FIG. 15 illustrates a comparison table of bubble escaping at an inclination angle θr.

Subsequently, an evaluation was performed on a case where the fluid control valve was rotated θr clockwise around the central axis P in a state of θz=65°. The straight line linking the IN side and the OUT side was maintained in the xz plane and the fluid control valve was rotated to satisfy θr=45° based on a position at which the IN side is in a right direction of x. As a result, in a combination of θz=65° and θr=45°, the bubbles were completely removed within 5 seconds. Therefore, it was confirmed that even if the fluid control valve was rotated 0° to 45° having the central axis as a base in a state of maintaining θz=65°, the bubble removing effect was obtained (FIG. 15).

In addition, by disposing the control valve in a disposition state of the electromagnetic valve of θr=0° and θz=65°, a dispensation examination of 120 uL was actually performed 1,000 times, and it was confirmed that a low value of approximately 1 to 5 uL with respect to an average dispensation amount observed at the time of bubbles being mixed did not occur at all.

At the time of exchanging the flow path or the electromagnetic valve, it is required to perform exchange after the liquid escaped from the flow path, and then to fill the flow path with a liquid again. Heretofore, after exchange operation, a reagent of approximately 300 ml was emptied with respect to a total volume of approximately 10 ml of the flow path and then the bubbles inside the flow path were removed. However, depending on the case, the bubbles did not completely escape and the reagent was additionally flown out. On the other hand, by disposing an electromagnetic valve in the above range (0°≤θr≤45°, 30°≤θz≤90°), the consumption amount of a reagent required after parts exchange is suppressed. More specifically, it was confirmed that when the electromagnetic valve was disposed in a range of θr=0° and θz=65°, the sufficient amount of reagent to be emptied for completely removing bubbles was 60 ml.

Example 2

Subsequently, description will be provided on a bubble removing operation and a bubble detecting function that further enhances a bubble removal efficiency. This example is particularly effective when used in combination of the disposition of the fluid control valve of Example 1. Hereinafter, description on the same parts as those of Example 1 will be omitted.

Regarding the bubbles mixed in the electromagnetic valve, there is a case where the bubbles are from dissolved gas, or there is a case where bubbles remaining at the end of a liquid feeding tube at the time of a reagent bottle exchange are fed as in the state. The bubbles remaining at the end of the liquid feeding tube have a relatively large volume, and there are not only the bubbles of less than 1 mm but also the bubbles with the volume exceeding 5 ul at which a liquid is segmented within a liquid feeding tube having an inner diameter of 1.5 mm. Even when only one bubble with such a volume exceeds the fluid control valve (bottle side) and is mixed in the dispensation flow path, dispensing accuracy is deteriorated.

Figure 6:
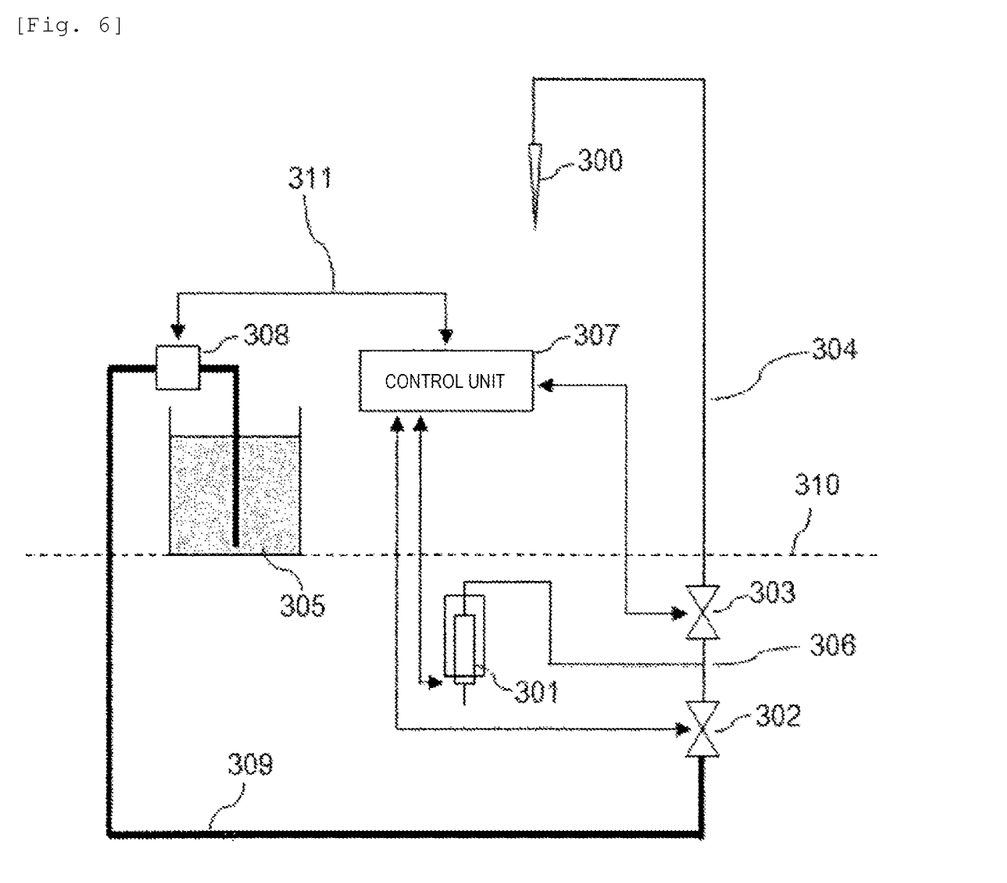
FIG. 6 illustrates a system diagram of a dispensation mechanism and a control unit of a biochemical automatic analysis apparatus and a schematic view of disposition of each component.

Here, as illustrated in FIG. 6, the risk is avoided by adding a mechanism and an operation for preventing mixing of a large amount of bubbles. As a first mechanism and operation, after an exchange operation of a reagent bottle 305, with an operation of causing a certain amount of a solution in the flow path to flow back to the reagent bottle 305 side and forcing bubbles out, the bubbles having entered from the bottle are prevented from passing through the electromagnetic valve and being mixed in the flow path on the syringe pump side. As a second mechanism and operation, with an operation of sucking the reagent exceeding the volume of the entire flow path from the reagent bottle 305 and expelling the reagent from a discharge nozzle 300, bubbles mixed in the flow path on the syringe pump side having not been prevented in the first operation escape. As a third mechanism and operation, by mounting a bubble detector 308 in the flow path ranging from the reagent bottle 305 to a fluid control valve (bottle side) 303, presence or absence of bubbles having entered from the bottle and the amount of bubbles are determined, and it is determined whether to carry out the first backflow operation or the second solution discharge operation, or to perform the above-described bubble removing treatment. The above-described three operations or mechanisms may be carried out alone, or may be carried out in combination. When these methods are carried out in combination, the effect is further increased.

Hereinafter, an example of a combination enhancing the effect is exemplified. After exchanging the reagent bottle 305, information that the operation has been carried out is transmitted to a control unit 307 via a conducting wire 311 as a signal. When the control unit 307 recognizes that the reagent bottle 305 has been exchanged, the control unit 307 performs control such that an operation of causing a solution within a reagent bottle side pipe 309 to flow back to the reagent bottle 305 side is started so as to prevent bubbles from being mixed from the emptied reagent bottle 305. Subsequently, a suction operation from the newly exchanged reagent bottle 305 is started. In a case where the bubbles are not removed by the control of the backflow operation of the solution within the reagent bottle side pipe 309, the bubble detector 308 present between the reagent bottle 305 and the fluid control valve (bottle side) 303 detects the bubbles, and if the amount of the bubbles are a predetermined amount or more, the suction operation is stopped and if the amount of the bubbles are less than the predetermined amount, a discharge operation for removing the bubbles having entered the flow path is carried out without stopping the suction operation.

Example 3

Hereinafter, description will be provided on a fluid control valve fixing tool with an angle switching function. This example is particularly effective when used in combination of the disposition of the fluid control valve of Examples 1 and 2. Hereinafter, description on the same parts as those of Example 1 will be omitted.

Figure 7:
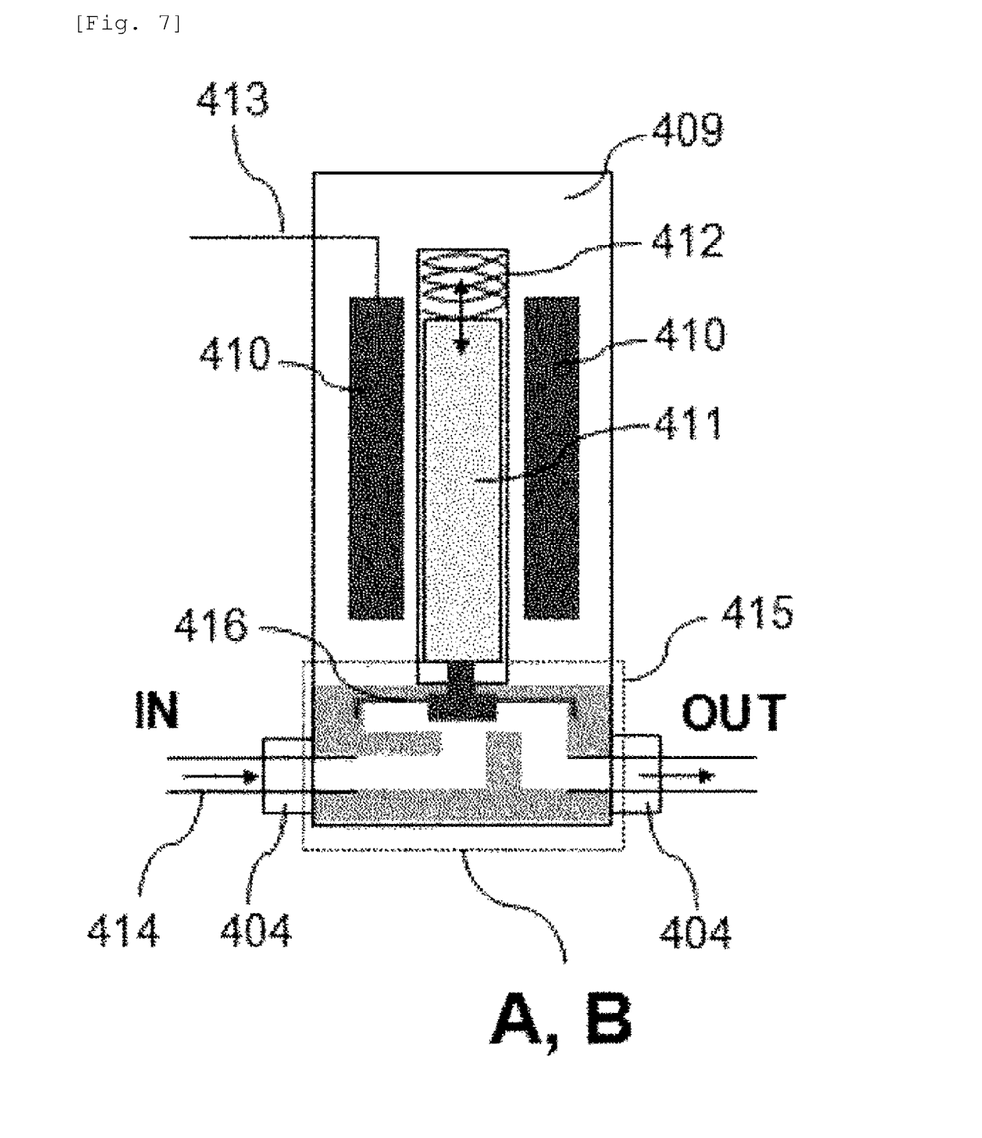
FIG. 7 illustrates a schematic view of a section of the diaphragm-type bidirectional electromagnetic valve.
Figure 8:
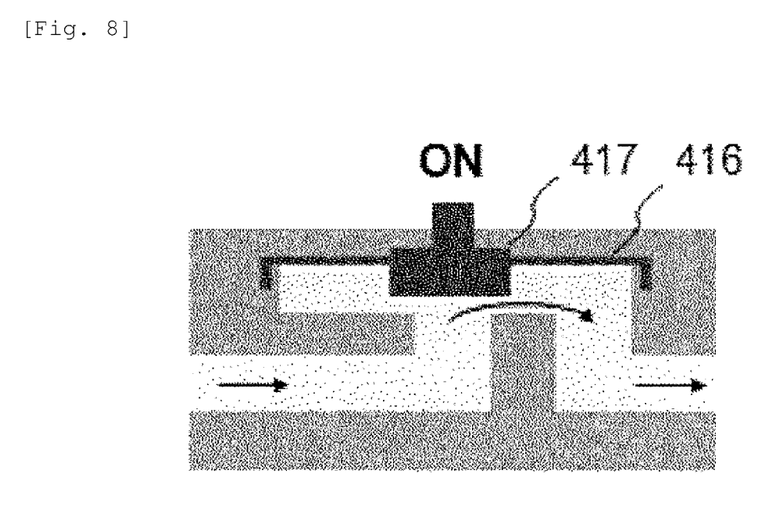
FIG. 8 illustrates a schematic view at the time of valve opening of the diaphragm-type bidirectional electromagnetic valve (normally closed).
Figure 9:
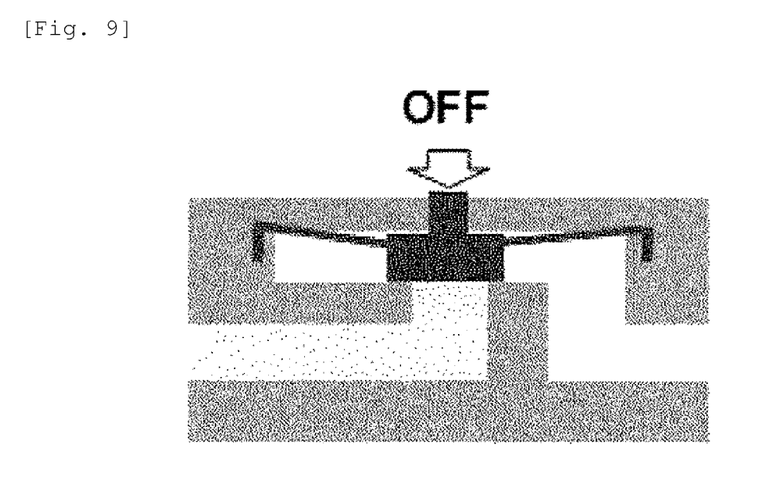
FIG. 9 illustrates a schematic view at the time of valve closing of the diaphragm-type bidirectional electromagnetic valve (normally closed).

Commercially available diaphragm-type electromagnetic valves are manufactured by a plurality of manufacturers. In particular, an electromagnetic valve with an orifice diameter of 3 mm or less frequently used for analysis devices is available on the market, with various orifice diameters, dead volumes, and materials, but the internal structure thereof has almost the same forms. FIG. 7 illustrates a simplified internal structure of a representative commercially available bidirectional electromagnetic valve. Among the electromagnetic valves, there are a normally closed type of which valve is opened at the time of energization and a normally opened type of which valve is closed at the time of energization. FIGS. 8 and 9 illustrate the normally closed type. The normally closed type has almost the same basic structure as that of the normally opened type except that a spring is disposed in a different manner. Both of the normally closed type and the normally opened type have a cylindrical space in which a diaphragm valve reciprocates in a flow path made of a resin, and as the diaphragm valve moves in the space, the flow path is opened and closed. In the normally opened type, the diaphragm valve operates in a direction of closing the flow path at the time of energization, and in the normally closed type, the diaphragm valve operates in a direction of opening the flow path at the time of energization. Any type of electromagnetic valve may be selected, but generally the normally closed type in which the flow path is blocked in a device stop state in order to prevent leakage of water is used in many cases.

As illustrated in FIG. 7, the electromagnetic valve is divided into a head 415 section that includes a liquid feeding tube 414 forming a flow path through which a solution flows and a diaphragm valve 416 closing the flow path, and a body 409 section in which a plunger 411 for driving the diaphragm valve 416, a coil 410, a spring 412, and a conducting wire 413 connected to the coil 410 are disposed. The head 415 section constituting the flow path can be made of a resin material such as polyetheretherketone (PEEK), polytetrafluoroethylene (PTFE), and polyphenylene sulfide (PPS), and similarly for the diaphragm, PTFE, or a fluorine-based rubber FKM, or an acrylonitrile butadiene rubber (NBR) is used. In addition, there is a case where a perfluororubber (KPF) is used in a portion of a water stopper 417 directly closing the flow path. In addition to these, various resin materials are used, but materials with strong hydrophobicity that are not easily contaminated and can reduce pressure loss due to solution resistance are basically selected. Therefore, materials having a characteristic that bubbles tend to remain are selected.

On the other hand, since the body 409 section is a so-called electromagnet-driven type, the plunger 411, the coil 410, the spring 412, and the conducting wire 413 are made of metal in most cases. In the related art, in a case of general use, the electromagnetic valve is disposed such that the head section is on a lower side, and the body 409 section is on an upper side, as illustrated in FIG. 7. This is for the purpose of preventing the body 409 from being damaged due to water when water is leaked from the head of the electromagnetic valve. In many cases, leakage of water occurs when a nipple 401 connecting the electromagnetic valve and the liquid feeding tube 414 is detached. Since the body section can be made of metal, there is a concern that when a liquid flooded from a liquid feeding tube 402 permeates through a joint between the body 409 section and the head 415 section, the plunger 411 or an inner wall portion rusts. In addition, when the coil 410 or the conducting wire 413 is damaged due to water, a short circuit occurs and the electromagnetic valve or the device body comes into failure.

Similar to Examples 1 and 2, in this example as well, the electromagnetic valve is turned upside down, and is disposed as being inclined based on a central axis direction of the electromagnetic valve to be fixed to a metal plate. Therefore, compared to a case of using the electromagnetic valve in a general posture, the leaked liquid easily affects the body 409 section. Here, the risk of damage due to water is avoided by employing a movable type metal plate as an electromagnetic-valve-fixing metal plate 403. An example thereof will be described using FIGS. 10 to 13.

Figure 10:
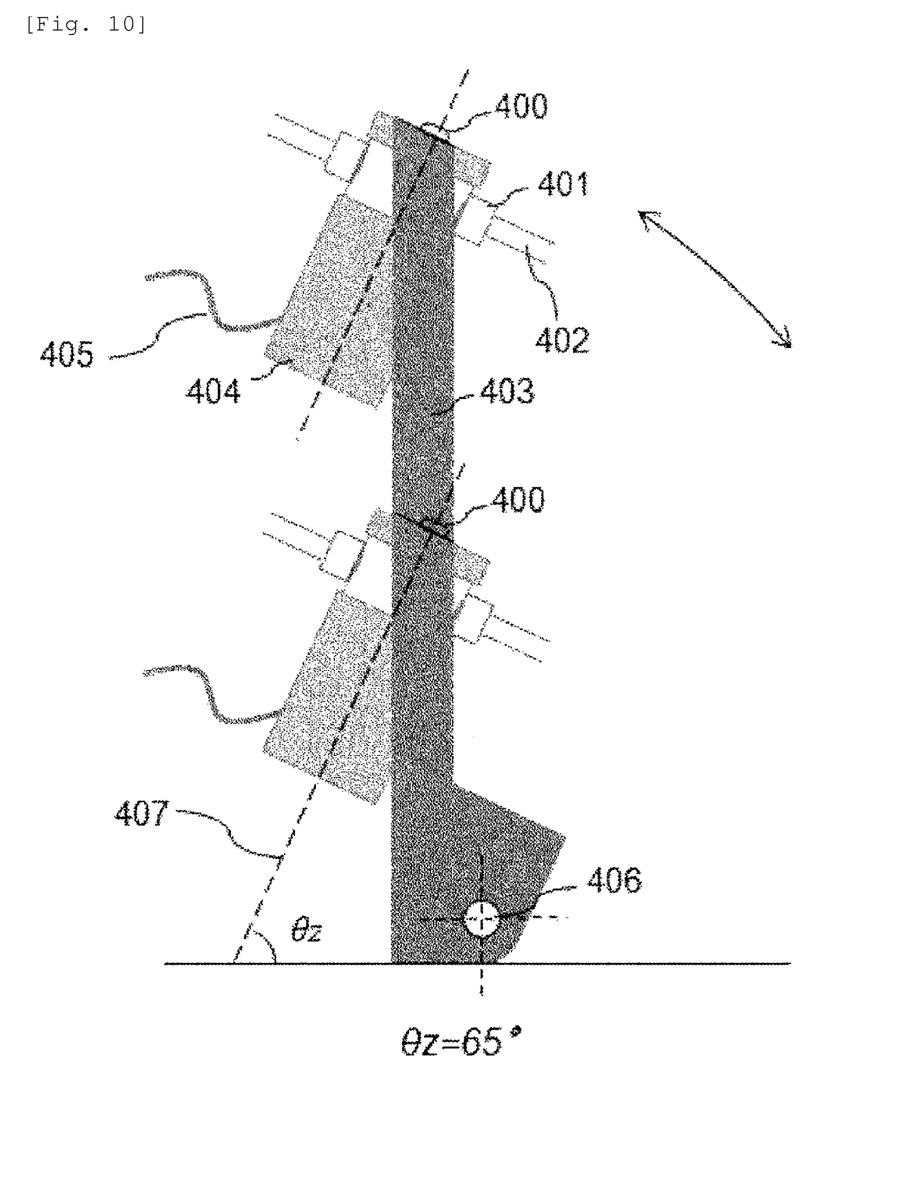
FIG. 10 illustrates a view at the time of dispensation operation of the fluid control valve fixed to a movable metal plate.

FIG. 10 is an overview diagram in which the electromagnetic valve is fixed to the fixing metal plate 403 (fixing member) such that a body 404 is disposed on a lower side, viewed from a direction in which a liquid inlet side of the body 404 is positioned on a right side and a liquid outlet side of the body 404 is positioned on a left side. Using a screw hole present at the tip end of the electromagnetic valve, the electromagnetic valve is fixed by a screw 400 to be suspended to the fixing metal plate 403. At this time, the electromagnetic valve is fixed such that the straight line linking the liquid inlet and the liquid outlet is 65° with respect to a vertical line and a central axis 408 of the electromagnetic valve is 65° with respect to a horizontal line. In FIG. 10, the fixing metal plate 403 is in a long rectangular shape in a vertical direction, and two electromagnetic valves are fixed to upper and lower portions of the fixing metal plate 403 as the electromagnetic valve 102 and the electromagnetic valve 103 are respectively disposed on the upper portion and the lower portion, as illustrated in the flow path diagram of FIG. 1. The fixing metal plate 403 has an angle switching mechanism capable of changing an angle formed by the straight line linking the liquid inlet and the liquid outlet of the fluid control valve and the horizontal plane. The angle switching mechanism has a fulcrum on a bottom side, for example, and can optionally move, having the fulcrum as a rotational shaft 406 until an angle θz formed by the central axis of the electromagnetic valve and a horizontal line reaches 0°.

Figure 11:
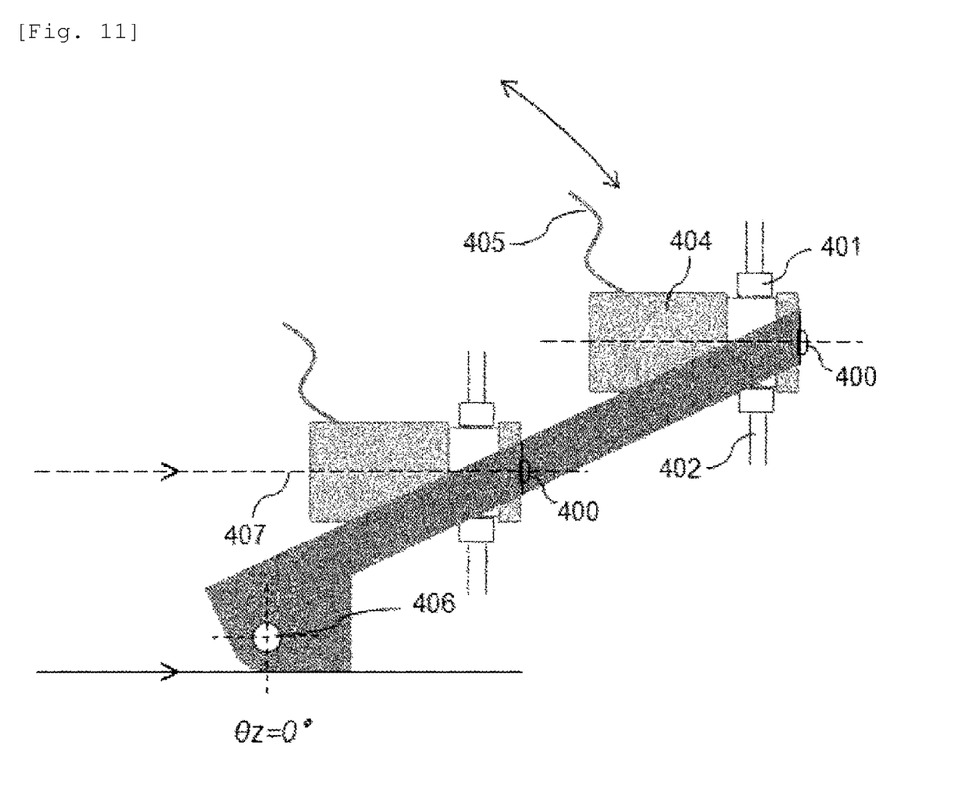
FIG. 11 illustrates a view at the time of maintenance of the fluid control valve fixed to the movable metal plate.

In addition, FIG. 10 illustrates a state where the fixing metal plate 403 is positioned upright with the rotational shaft 406 as a center, and FIG. 11 illustrates a state where the fixing metal plate 403 is pushed down with the rotational shaft 406 as a center. During dispensation operation, the fixing metal plate 403 is in an upright state (at least as described above, state of being inclined to the horizontal plane) as illustrated in FIG. 10, and when the liquid feeding tube 402 is detached for maintenance or the like, the fixing metal plate 403 is pushed down toward a front side with the device facing the front, as illustrated in FIG. 11. In FIG. 11, the straight line linking the liquid inlet and the liquid outlet of the fluid control valve is at an angle to be perpendicular to the horizontal plane. With this, each of the electromagnetic valves is pushed down toward a lateral direction, and accessibility to the nipple is improved. In addition, even if water is leaked from the liquid feeding tube 402, water does not reach the body 409 section of the electromagnetic valve and thus damage due to water can be avoided.

Figure 12:
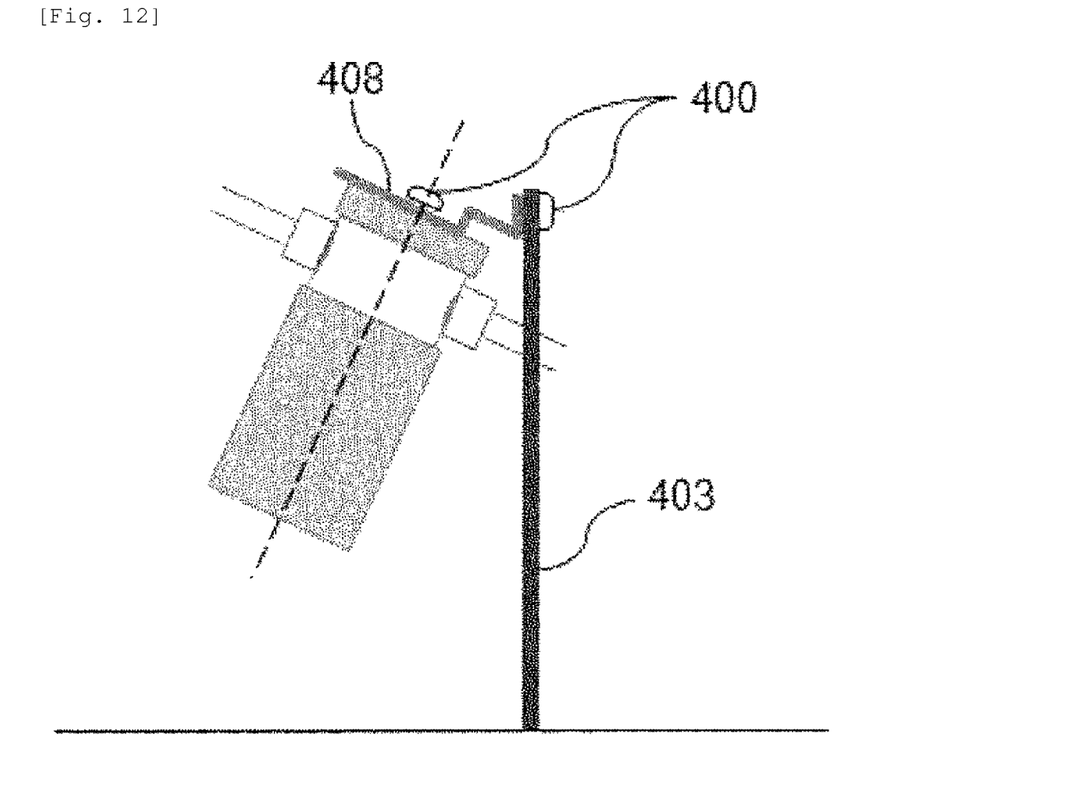
FIG. 12 illustrates a view of a disposition of the fluid control valve using an attachment metal plate at the time of dispensation operation.
Figure 13:
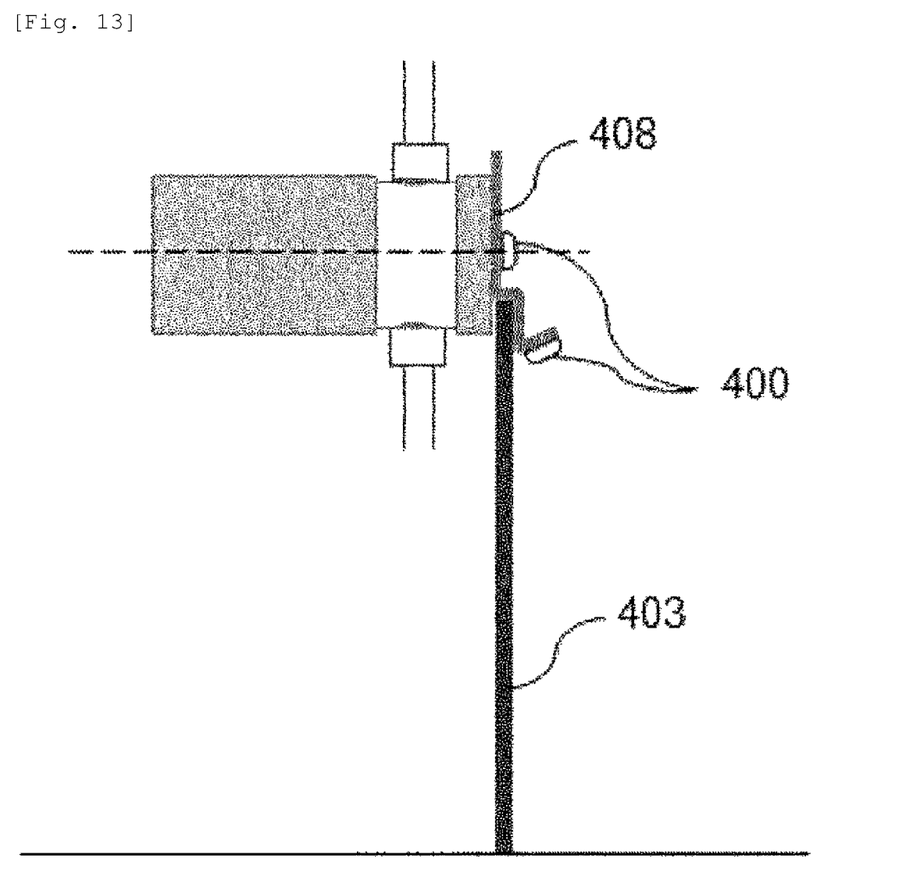
FIG. 13 illustrates a view of a disposition of the fluid control valve using the attachment metal plate at the time of maintenance.

In addition, each fixing disposition can be set using an attachment metal plate 408 as illustrated in FIGS. 12 and 13. The attachment metal plate 408 is detachably fixed to the fixing metal plate 403. The attachment metal plate 408 includes a first attachment portion at an angle capable of holding the fluid control valve to be inclined to the fixing metal plate 403, a holding portion holding the fluid control valve at an angle at which the flow path of the fluid control valve is in a vertical direction, and a second attachment portion attached to the fluid control valve.

The attachment metal plate 408 also operates as an angle switching mechanism. During dispensation operation, the fluid control valve is screwed into the fixing metal plate 403 being inclined by the first attachment portion, as illustrated in FIG. 12, and during maintenance, a bent portion (holding portion) of the attachment metal plate 408 is hooked to the fixing metal plate 403 and the nipple 401 can be detached, as illustrated in FIG. 10. The attachment method may be selected in consideration of a space in each device or accessibility.

The present invention is not limited to the above-described examples, and includes various modification examples. For example, the above-described examples are detailed descriptions for easily describing the present invention, and are not necessarily limited to those including all of the described configurations. In addition, a part of the configuration of any one example can be substituted with the configuration of another example, and the configuration of any one example can be added with the configuration of another example. Moreover, with respect to a part of the configuration of each example, addition, deletion, and substitution of the configuration of another example can be performed. In addition, regarding each of the above-described configurations, functions, processing units, processing means, and the like, a part or all thereof may be realized in hardware by being designed by an integrated circuit, for example. Moreover, each of the above-described configurations, functions, and the like may be realized in software by a processor translating a program for realizing each of the functions and carrying out thereof.

Information on a program realizing each of the functions, tables, files, and the like can be placed in recording devices such as a memory, a hard disk, a solid state drive (SSD) or recording medium such as an IC card, a SD card, and an optical disk.

In addition, regarding the control line or the information line, those that are considered necessary to be explained are disclosed, and all of the control line or the information line is not necessarily disclosed in terms of the product. In actual, almost all the configurations may be considered to be connected to one another.

REFERENCE SIGNS LIST

100: Discharge nozzle, 101: Syringe pump, 102: Fluid control valve (discharge nozzle side), 103: Fluid control valve (reagent bottle side), 104: Liquid feeding tube, 105: Reagent bottle, 106: Branch, 107: Head, 108: Diaphragm, 109: Bubble, 110: Trace bubble, 111: fluid, 200: Diaphragm, 201: Valve chamber, 202: Head, 203: Outlet, 204: Liquid inlet, 300: Discharge nozzle, 301: Syringe pump, 302: Fluid control valve (discharge nozzle side), 303: Fluid control valve (reagent bottle side), 304: Liquid feeding tube, 305: Reagent bottle, 306: Branch, 307: Control unit, 308: Bubble detector, 309: Reagent bottle side pipe, 310: Reagent bottle bottom surface, 311: Conducting wire, 400: Screw, 401: Nipple, 402: Liquid feeding tube, 403: Fixing metal plate, 404: Body, 405: Conducting wire, 406: Rotational shaft, 407: Central axis, 408: Attachment metal plate, 409: Body, 410: Coil, 411: Plunger, 412: Spring, 413: Conducting wire, 414: Liquid feeding tube, 415: Head, 416: Diaphragm valve, 417: Water stopper

The invention claimed is:

1. A dispensing device comprising:
a discharge nozzle;
a liquid feeding tube that is disposed so as to connect a reagent bottle in which a reagent is stored and the discharge nozzle to each other and forms a flow path of the reagent; and
a fluid control valve that is disposed on a route of the liquid feeding tube connecting the reagent bottle and the discharge nozzle to each other,
wherein the fluid control valve is provided with a liquid flow path, of the reagent, having a liquid inlet and a liquid outlet and a diaphragm disposed in the flow path between the liquid inlet and the liquid outlet, the diaphragm having a bottom side in contact with the reagent flowing below and having a central axis that is perpendicular to a flow axis extending from the liquid inlet to the liquid outlet, and
wherein the fluid control valve is disposed in an orientation such that the central axis of the diaphragm forms an angle with a horizontal plane which is 30° to 90°.

2. The dispensing device according to claim 1,
wherein the diaphragm valve is disposed in an orientation such that, in the flow path of the diaphragm valve, the liquid inlet is positioned lower than the liquid outlet.

3. The dispensing device according to claim 1,
wherein the diaphragm valve is subjected to a hydrophilization treatment.

4. The dispensing device according to claim 1, further comprising:
a bubble detector disposed in the flow path of the reagent ranging from the reagent bottle to the fluid control valve; and
a control unit that determines whether to perform a dispensation treatment of the reagent, or to perform a bubble removing treatment, depending on the amount of bubbles detected by the bubble detector.

5. The dispensing device according to claim 4, wherein the fluid control valve is a reagent bottle side fluid control valve, wherein the dispensing device further comprises a discharge nozzle side fluid control valve disposed between the reagent bottle side fluid control valve and the discharge nozzle, and a syringe pump connected to the route of the liquid feeding tube at a location between the reagent bottle side fluid control valve and the discharge nozzle side fluid control valve, and wherein the control unit is programmed to:
   in a case of dispensing the reagent, close the discharge nozzle side fluid control valve, open the reagent bottle side fluid control valve, and performing a suction operation using the syringe pump to suck the reagent from the reagent bottle to the liquid feeding tube;
   in a case of discharging the reagent, close the reagent bottle side fluid control valve, open the discharge nozzle side fluid control valve, perform a discharge operation using the syringe pump to discharge the reagent from the liquid feeding tube to the discharge nozzle; and
   upon detecting bubbles by the bubble detector, if an amount of the bubbles detected is equal to or higher than a preset amount, the suction operation is stopped and, if the amount of the bubbles is less than the preset amount, the discharge operation for removing the bubbles having entered the flow path is carried out without stopping the suction operation.

6. The dispensing device according to claim 1, further comprising:
   a fixing member to which the fluid control valve is fixed; and
   an angle switching mechanism capable of changing an angle formed by a straight line linking the liquid inlet and the liquid outlet of the fluid control valve and the horizontal plane.

7. The dispensing device according to claim 6, wherein the angle switching mechanism is capable of switching an angle such that, when performing dispensation operation, the straight line linking the liquid inlet and the liquid outlet is at an angle inclined to the horizontal plane, and when performing maintenance, the straight line linking the liquid inlet and the liquid outlet is at an angle perpendicular to the horizontal plane.

8. The dispensing device according to claim 6, wherein the angle switching mechanism is a rotational shaft of the fixing member.

9. The dispensing device according to claim 6, wherein the angle switching mechanism is an attachment member attached to the fixing member, and
   wherein the attachment member includes a first attachment portion at an angle capable of holding the fluid control valve to be inclined to the fixing member, a holding portion holding the fluid control valve at an angle at which the flow path of the fluid control valve is in a vertical direction, and a second attachment portion fixed to the fluid control valve.

10. An automatic analysis apparatus comprising: the dispensing device according to claim 1.

11. The dispensing device according to claim 1, wherein the angle is 65°.

12. The dispensing device according to claim 11, wherein the flow axis extending from the liquid inlet to the liquid outlet is rotated in a clockwise direction with respect to the central axis, as viewed from above the diaphragm, by an angle of 45°.

13. The dispensing device according to claim 1, wherein the flow axis extending from the liquid inlet to the liquid outlet is rotated in a clockwise direction with respect to the central axis, as viewed from above the diaphragm, by an angle of 0-45°.

14. The dispensing device according to claim 1, wherein the control unit is programmed, upon exchanging the reagent bottle, to:
   perform a backflow operation of causing a solution within a reagent bottle side pipe between the reagent bottle and the fluid control valve to flow back to the reagent bottle.

* * * * *